United States Patent Office 3,517,014
Patented June 23, 1970

3,517,014
METHOD OF PREPARING 8-HYDROXYQUINO-LINE-3-CARBOXYLIC ACIDS
George Y. Lesher, Schodack, N.Y., assignor to Sterling Drug Inc., New York, N.Y., a corporation of Delaware
No Drawing. Continuation-in-part of application Ser. No. 697,301, Jan. 12, 1968. This application June 16, 1969, Ser. No. 833,737
Int. Cl. C07d 33/48
U.S. Cl. 260—287        12 Claims

ABSTRACT OF THE DISCLOSURE

The process which comprises the steps of reacting a 3-carboxy-8-(R—$CH_2$)-7-$R_7$-1,7-naphthyridinium salt with an aqueous alkaline medium and acidifying the alkaline reaction mixture, thereby producing an 8-hydroxy-7-R-quinoline-3-carboxylic acid, wherein R is hydrogen, lower-alkyl having from one to five carbon atoms inclusive or phenyl-X where X is alkylene having from one to four carbon atoms inclusive, and $R_7$ is lower-alkyl or lower-alkenyl. The 8-hydroxyquinoline-3-carboxylic acids produced by the process are useful as antibacterial agents, e.g., 7-benzyl-4,8-dihydroxy-6-methylquinoline-3-carboxylic acid.

---

This invention relates to a method of preparing 8-hydroxyquinoline-3-carboxylic acids from 3-carboxy-8-(lower-alkyl)-1,7-naphthyridinium salts.

This application is a continuation-in-part of copending application Ser. No. 697,301, filed Jan. 1, 1968, which in turn is a division of copending application Ser. No. 428,244, filed Jan. 26, 1965, now U.S. Pat. 3,429,887, issued Feb. 25, 1969, said application Ser. No. 428,244 being a continuation-in-part of copending application Ser. No. 255,210, filed Jan. 31, 1963 and now abandoned.

Disclosed and claimed in U.S. Pat. 3,429,887 are the 1,8-di-(lower-alkyl)-1,4-dihydro-4-oxo-1,7-naphthyridine-3-carboxylic acids which are used as intermediates in the preparation of the 1,7-naphthyridinium salts used in the method of the instant application. These intermediates have the Formula I

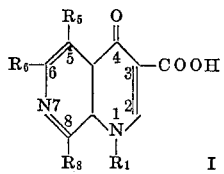

where $R_1$ is lower-alkyl; $R_5$ and $R_6$ are each hydrogen or lower-alkyl; and $R_8$ is lower-alkyl. Also disclosed in U.S. Pat. 3,429,887 are the compounds of Formula I where $R_1$ is hydrogen, that is, the compounds optionally and tautomerically designated as 5-$R_5$-6-$R_6$-8-$R_8$-4-hydroxy-1,7-naphthyridine-3-carboxylic acids; these compounds also are useful as intermediates in the preparation of 1,7-naphthyridinium salts used in the method of the instant application.

The term "lower-alkyl" as used throughout this specification, e.g., as used in the definitions for $R_1$, $R_5$, $R_6$ or $R_8$ in Formula I, means alkyl radicals having from one to six carbon atoms which can be arranged as straight or branched chains, among which are, for purposes of illustration but without limiting the generality of the foregoing, methyl, ethyl, n-propyl, isopropyl, 2-butyl, isobutyl and n-hexyl. As noted hereinbelow, the carbon atom of lower-alkyl ($R_8$) attached to the 8-carbon atom of the 1,7-naphthyridine ring contains at least two hydrogen atoms.

The term "lower-alkenyl," as used throughout this specification, means alkenyl radicals having preferably from three to six carbon atoms, as illustrated by 2-propenyl (allyl), 2-methyl-2-propenyl (methallyl), 2-butenyl, 3-butenyl and 2-hexenyl.

The term "alkylene," as used throughout this specification and designated hereinbelow as X, means alkylene radicals having from one to four carbon atoms inclusive, among which are, for purposes of illustration but without limiting the generality of the foregoing,

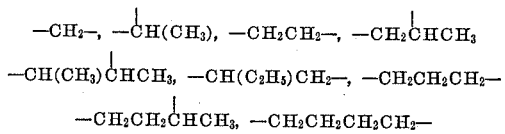

and the like.

The processes for preparing the compounds of Formula I where $R_1$ is lower-alkyl and hydrogen are disclosed in said U.S. Pat. 3,429,887.

In the process for preparing the 1-(lower-alkyl)-1,4-dihydro-4-oxo-1,7-naphthyridine-3-carboxylic acids by reacting a 4-hydroxy-1,7-naphthyridine-3-carboxylic acid or lower-alkyl ester thereof with a lower-alkyl ester, e.g., halide, the alkylation occurs at the 1-nitrogen atom; however, I found that a competing quaternization reaction also occurs at the 7-nitrogen atom. For example, ethyl 4-hydroxy-8-methyl-1,7-naphthyridine-3-carboxylic when reacted with methyl iodide in dimethylformamide in the presence of anhydrous potassium carbonate yielded a mixture of ethyl 1,4-dihydro-1,8-dimethyl-4-oxo-1,7-naphthyridine-3-carboxylate and 3-carbethoxy-7,8-dimethyl-4-hydroxy-1,7-naphthyridinium iodide. Quaternization at the 7-position is favored by the absence of an acid-acceptor. As presented hereinbelow, the 7-alkylated-4-hydroxy-1,7-naphthyridinium salts bearing an 8-lower-alkyl) substituent, as well as their hydroxide inner salts, are useful in the preparation of 4,8-dihydroxyquinolines.

Disclosed in said U.S. Pat. 3,429,887 are quaternary-ammonium salts of the aforesaid 1-alkyl-1,4-dihydro-4-oxo-1,7-naphthyridine-3-carboxylic acids and esters, quaternization occurring at the 7-ring-nitrogen. These salts where bearing an 8-(lower-alkyl) substituent are useful as intermediates in the instant method for the preparation of 8-hydroxy-4-oxoquinoline-3-carboxylic acids described hereinbelow. Said quaternary ammonium salts are obtained by the addition of a lower-alkyl ester having a molecular weight less than about 200 to the free base form of the compounds. A preferred class of esters comprises lower-alkyl and lower-alkenyl esters of inorganic acids or organic sulfonic acids of the formula $R_7$-An where $R_7$ is lower-alkyl or lower-alkenyl, and An is an anion of a strong inorganic acid or an organic sulfonic acid, e.g., chloride, bromide, iodide, sulfate, methanesulfonate, benzenesulfonate, or paratoluenesulfonate. $R_7$-An is thus illustrated by, but not limited to, methyl chloride, methyl bromide, methyl iodide, ethyl bromide, propyl chloride, isobutyl bromide, allyl chloride, allyl bromide, methyl sulfate, methallyl chloride, methyl methanesulfonate, methyl benzenesulfonate, methyl p-toluenesulfonate, and the like. The quaternary ammonium salts are prepared by mixing the free base and the alkyl ester in an organic solvent inert under the conditions of reaction, for example, ethanol, methanol, ether, acetonitrile, dimethylformamide, dimethyl sulfoxide, and the like or, alternatively in the absence of a solvent. Heating is preferably used to facilitate the reaction; while quaternary formation takes place at room temperature, a longer reaction time is needed. The quaternary ammonium salt separates directly or can be obtained by concentration of the solution.

Also disclosed and claimed in said U.S. Pat. 3,429,887 are the 8-(lower-alkyl)-7-$R_7$-1,7-naphthyridinium salts, where $R_7$ is lower-alkyl or lower-alkenyl and where the salts include both those with an external anion, An (defined hereinabove), whose nature is not critical, and internal or inner salts, where a 4–O⁻ or 3–COO⁻ group provides the anion. These compounds are useful as intermediates in my hereinbelow-described novel process for preparing 8-hydroxyquinolines. Without limiting the generality of the foregoing, illustrative and preferred embodiments of said quaternary ammonium salts are 3-carboxy-7,8-di-(lower-alkyl)-1,7-naphthyridinium salts, in particular, 3 - carboxy - 7,8 - di - (lower-alkyl)-4-hydroxy-1,7-naphthyridinium salts and 3-carboxy-1,4-dihydro-1,7,8-tri - (lower - alkyl)-4-oxo-1,7-naphthyridinium salts. Preferred hydroxide inner salt derivatives are 3-carboxy-4-hydroxy - 7-(lower-alkyl)-1,7-naphthyridinium hydroxide inner salts and 3 - carboxy - 1,4-dihydro-1,7,8-tri-(lower-alkyl)-4-oxo-1,7-naphthyridinium hydroxide inner salts, illustrative and preferred embodiments of which are those of the respective Formulas II and III:

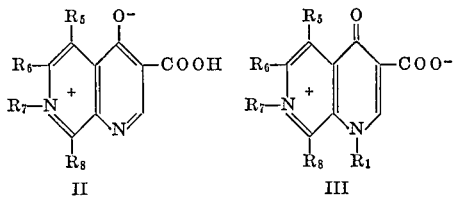

wherein each formula $R_5$ and $R_6$ are each hydrogen or lower-alkyl, $R_7$ is lower-alkyl or lower-alkenyl and $R_8$ is lower-alkyl attached to the 8-carbon atom of the 1,7-naphthyridine ring through one of its carbon atoms containing at least two hydrogen atoms.

The inner salts are prepared, as described hereinbelow in the specific exemplary disclosure, by reacting the corresponding 8 - (lower - alkyl)-7-$R_7$-1,7-naphthyridinium salts, e.g., halides, with an acid-acceptor under mild reaction conditions and sufficient to neutralize the salt, e.g., halide, to form the hydroxide inner salt. This neutralization is conveniently carried out by treating an aqueous solution of the naphthyridinium salt, e.g., halide, with sufficient acid-acceptor, e.g., potassium hydroxide, sodium hydroxide, potassium bicarbonate, ammonia, triethylamine, preferably in aqueous solution to adjust the pH to about 6–7; the inner salt readily precipitates or is precipitated by adding a suitable solvent, e.g., acetone.

Other intermediate 3-carboxy-4-hydroxy-5-$R_5$-6-$R_6$-7-$R_7$-8-(R—$CH_2$)-1,7-naphthyridinium salts where $R_5$, $R_6$ and $R_7$ are defined as in formula II and R—$CH_2$ where R is phenyl-X where X is lower-alkylene having from one to four carbon atoms inclusive are readily prepared by heating the corresponding 3-carboxy-4-hydroxy-5-$R_5$-6-$R_6$-7-$R_7$-8-methyl-1,7-naphthyridinium salt, e.g., halide or hydroxide inner salt, with a phenyl-X halide, e.g., chloride, bromide, etc., in a suitable solvent, e.g., dimethylformamide, as illustrated further hereinbelow in the specific exemplary disclosure. $R_8$ thus in a broader sense can be designated as R—$CH_2$ where R is hydrogen, lower-alkyl having from one to five carbon atoms inclusive and phenyl-X where X is alkylene having from one to four carbon atoms inclusive.

The process of my invention sought to be patented in the instant application comprises the steps of reacting a 3-carboxy-8-(R—$CH_2$)-7-$R_7$-1,7-naphthyridinium salt with an aqueous alkaline medium and acidifying the alkaline reaction mixture, thereby producing an 8-hydroxy-7-R-quinoline-3-carboxylic acid, where R is hydrogen, lower-alkyl having from one to four carbon atoms inclusive or phenyl-X where X is alkylene from one to four carbon atoms inclusive. Without limiting the generality of the foregoing, illustrative and preferred embodiments are: the preparation of an 8-hydroxy-quinoline-3-carboxylic acid from a 3-carboxy-7,8-di-(lower-alkyl)-1,7-naphthyridinium salt, in particular, a 4,8-dihydroxy-quinoline-3-carboxylic acid from a 3-carboxy-4-hydroxy-7,8-di-(lower-alkyl)-1,7-naphthyridinium salt or a 1,4-dihydro-8-hydroxy-1-(lower-alkyl) - 4 - oxoquinoline - 3 - carboxylic acid from a 3-carboxy-1,4-dihydro - 1,7,8 - tri-(lower-alkyl)-4-oxo-1,7-naphthyridinium salt, the preparation of a 4,8-dihydroxyquinoline-3-carboxylic acid from a 3-carboxy-4-hydroxy-7,8-di-(lower-alkyl) - 1,7 - naphthyridinium hydroxide inner salt, and, the preparation of a 1,4 - dihydro-8-hydroxy-1-(lower-alkyl)-4-oxoquinoline-3-carboxylic acid from a 3-carboxy-1,4-dihydro-1,7,8-tri-(lower-alkyl)-4-oxo-1,7-naphthyridinium hydroxide inner salt. These conversions to 8-hydroxyquinoline-3-carboxylic acids are further illustrated by the following conversion of: 3-carboxy-7,8-dimethyl-1,7-naphthyridinium iodide to 8-hydroxyquinoline-3-carboxylic acid, 3-carboxy - 4 - hydroxy-7,8-dimethyl-1,7-naphthyridinium iodide or hydroxide inner salt to 4,8-dihydroxyquinoline-3-carboxylic acid, 3-carboxy-4-hydroxy-6,7,8-trimethyl-1,7 - naphthyridinium iodide or hydroxide inner salt to 4,8-dihydroxy-6-methyl-quinoline-3-carboxylic acid, 3-carboxy-8-ethyl-4-hydroxy-6,7-dimethyl - 1,7 - naphthyridinium iodide or hydroxide inner salt to 4,8-dihydroxy-6,7-dimethylquinoline-3-carboxylic acid, and 3-carboxy-1,4-dihydro - 1,6,7,8 - tetramethyl-4-oxo-1,7-naphthyridinium iodide or hydroxide inner salt to 1,4-dihydro-1,6-dimethyl-8-hydroxy-4-oxoquinoline-3-carboxylic acid. In each instance, the other product of the conversion is $R_7$-$NH_2$, i.e., a lower-alkylamine or a lower-alkenylamine, e.g., methylamine when $R_7$ is methyl or allylamine when $R_7$ is allyl. These conversions are carried out by reacting the 3-carboxy-1,7-naphthyridinium salt with an aqueous alkaline medium, preferably an aqueous solution of alkali hydroxide, e.g., potassium or sodium hydroxide. The reaction is conveniently carried out by heating the alkaline reaction mixture on a steam bath or under gentle reflux for a period of time sufficient to complete the conversion. In the conversion of the naphthyridinium salt derivatives of Formula I where $R_1$ is lower-alkyl, it was found that the reaction could be carried out at room temperature; however, in the conversion of the naphthyridinium salt derivatives of Formula I where $R_1$ is hydrogen heating was found to be preferable in order to reduce the reaction time, e.g., the reaction was conveniently run by heating on a steam bath. Quaternary ammonium salts of the 3-carboxy-4-OH type or 1-$R_1$-3-carboxy-4-oxo type are probably first converted, as noted above, to corresponding hydroxide inner salts of the probable respective formulas II and III. The initial conversion to the hydroxide inner salt requires one molar equivalent of alkali hydroxide and the rearrangement conversion to the 8-hydroxyquinoline-3-carboxylic acid requires a second molar equivalent of alkali hydroxide. Thus, the aqueous alkaline medium contains at least two molar equivalents of alkali hydroxide per mole of 3-carboxy-1,7-naphthyridinium salt, e.g., halide, and, in practice, a multi-molar excess of the alkali hydroxide was preferably used in order to reduce the reaction time. Optionally, water-soluble organic solvents, e.g., methanol, ethanol, dimethyl sulfoxide, tetrahydrofuran, dimethylformamide, etc., can be utilized in the aqueous alkaline medium.

It is noted that in the above reaction when the intermediate salt bears an 8-methyl substituent, i.e., $R_8$ is R—$CH_2$ where R is hydrogen, the resulting 8-hydroxyquinoline-3-carboxylic acid is unsubstituted at its 7-position; however, when the intermediate salt bears lower-alkyl other than methyl at the 8-position, the resulting 8-hydroxyquinoline-3-carboxylic acid has a 7-alkyl group which has one less carbon atom than the 8-alkyl group of the intermediate salt, i.e., where R is lower-alkyl having from one to five carbon atoms inclusive. Thus, a 3-carboxy-8-ethyl - 1,7 - naphthyridinium salt yields an 8-hydroxy-7-methylquinoline-3-carboxylic acid, a 3-carboxy-8-n-propyl-1,7-naphthyridinium salt yields an 8-hydroxy-7-ethylquinoline-3-carboxylic acid, etc. As noted hereinabove, the 8-(lower-alkyl) substituent of the 1,7-naphthyridinium salt can bear a phenyl substituent, that is, $R_8$ is R—$CH_2$ where R is phenyl-X where X is alkylene having from one to four carbon atoms inclusive; thus, an 8-(3-phenylpropyl)- or 8-(2-phenylethyl)-3-carboxy-1,7-naphthyridinium salt yields, respectively, an 8-hydroxy-7-(2-phenylethyl)quinoline-3-carboxylic acid or a 7-benzyl-8-hydroxyquinoline-3-carboxylic acid.

Without limiting the generality of the foregoing, illustrative and preferred 8-hydroxyquinoline-3-carboxylic acids produced by the process of the claimed invention are those of Formula IV

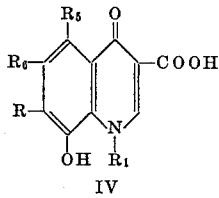

where $R_1$ is hydrogen or lower-alkyl, $R_5$ and $R_6$ are each hydrogen or lower-alkyl, and R is hydrogen, lower-alkyl having from one to five carbon atoms inclusive or phenyl-X where X is alkylene having from one to four carbon atoms inclusive. The compounds of Formula IV where $R_1$ is hydrogen exist in tautomeric forms. This tautomerism is illustrated as follows:

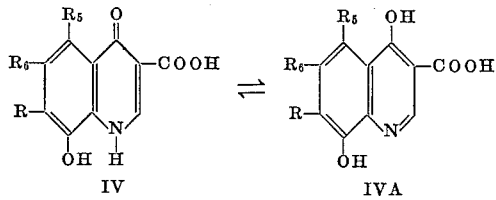

As with all tautomeric systems, the rate of transformation IV⇌IVA and the ratio IV/IVA are dependent on the thermodynamic environment, including the state of aggregation; so that measurements by any particular technique do not necessarily have validity except under the conditions of the measurement, thereby, among other consequences, giving rise to problems for any simple designation of the physical embodiments. According to investigations carried out with 4- hydroxyquinoline-3-carboxylic acids, indications are that these compounds would exist predominantly as IV, but nevertheless I have preferred to use the names based on structure IVA, that is, 4,8-dihydroxyquinoline-3-carboxylic acids, although it is understood that either or both structures are comprehended.

Although the products produced by the process of the invention are generally known, a particularly preferred novel product of the process comprises a product aspect of the invention, namely, 7-benzyl-4,8-dihydroxy-6-methylquinoline-3-carboxylic acid which optionally can be designated tautomerically as 7-benzyl-1,4-dihydro-8-hydroxy-6-methyl-4-oxoquinoline-3-carboxylic acid. This compound when tested by standard antibacterial screening procedures was found to have antibacterial activity, e.g., against *Staphylococcus aureus* and *Eberthella coli*.

The 8-hydroxyquinoline-3-carboxylic acids produced by the process of the invention are useful as antibacterial agents. For example, when tested by standard antibacterial test procedures, these compounds were found to have bacteriostatic activity, e.g., against *Staphylococcus aureas* and *Eberthella coli* at concentrations of about 0.05 to 2 mg./ml.

The molecular structures of the 8-hydroxyquinoline-3-carboxylic acids produced by the process of my invention were assigned on the basis of study of their infrared, ultraviolet and NMR spectra, and confirmed by the correspondence of calculated and found values for the elementary analyses for representative examples.

The corresponding rearrangement process of preparing 3-unsubstituted-8-hydroxyquinolines from 3 - unsubstituted-8-(lower-alkyl)-7-$R_7$-1,7-naphthyridinium salts is described and claimed in the above noted copending application Ser. No. 697,301.

The following examples will further illustrate the invention.

EXAMPLE 1

Ethyl 1,4-dihydro-1,6,8-trimethyl-4-oxo-1,7-naphthyridine-3-carboxylate was prepared as follows: A mixture containing 148 g. of ethyl-4-hydroxy-6,8-dimethyl-1,7-naphthyridine-3- carboxylate and 207 g. of anhydrous potassium carbonate in three liters of dimethylformamide was stirred on a steam bath until the naphthyridine dissolved (about 30 minutes). To this mixture was added 100 cc. of methyl iodide and the resulting mixture was heated, with stirring, for two hours on a steam bath. The hot reaction mixture was filtered and the filtrate chilled. The crystalline product was washed successively with small quantities of cold dimethylformamide, water and acetone. There was thus obtained 64 g. (41%) of the product, ethyl 1,4 - dihydro - 1,6,8-trimethyl-4-oxo-1,7-naphthyridine-3-carboxylate, M.P. 222–225° C., which was used in Example 2 to prepare the corresponding 3-carboxylic acid. A sample was recrystallized from ethanol using decolorizing charcoal to yield the compound as yellow needles, M.P. 224.0–228.6° C. (corr.).

The intermediate ethyl 4-hydroxy-6,8-dimethyl-1,7-naphthyridine-3-carboxylate was prepared as follows: To a stirred refluxing solution of 3100 cc. of diethyl phthalate was added over a period of about four minutes 312 g. of diethyl N-(2,6-dimethyl-3-pyridyl)aminomethylenemalonate. The reaction temperature dropped to about 277° C. Heating was continued for about four minutes as the temperature rose to 282° C. The source of heat was removed and ethanol was added to the hot reaction mixture with continued stirring as fast as its distillation would allow (900 cc. were added in seven minutes). The reaction mixture was allowed to cool to room temperature with stirring. The precipitate was collected, washed well with acetone, and dried in air to yield 159 g. (60%) of the product, ethyl 4-hydroxy-6,8-dimethyl-1,7-naphthyridine-3-carboxylate, M.P. 288–291° C. with decomposition. The above preparation also was carried out using Dowtherm® A (a eutectic mixture of diphenyl and diphenyl ether) in place of diethyl phthalate.

Following the procedure described above for the preparation of ethyl 4-hydroxy-6,8-dimethyl-1,7-naphthyridine-3-carboxylate using corresponding molar equivalent quantities of the appropriate diethyl N-(substituted-3-pyridyl)aminomethylenemalonate, the ethyl 4-hydroxy-1,7-naphthyridine-3-carboxylates of Table A were prepared:

TABLE A

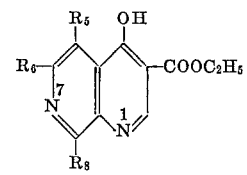

| No. | $R_5$ | $R_6$ | $R_8$ | M.—., °C. (corr.) |
|---|---|---|---|---|
| 1 | H | $C_2H_5$ | $CH_3$ | [1] 265.0–266.0 |
| 2 | H | $C_2H_5$ | $C_2H_5$ | 237.0–238.2 |
| 3 | H | H | $CH_3$ | [1] 278.0–278.8 |
| 4 | $CH_3$ | $CH_3$ | $CH_3$ | [2] 232–23 |

[1] Dec.
[2] Dec., uncorr.

Diethyl N-(2,6-dimethyl - 3 - pyridyl)aminomethylenemalonate was prepared as follows: A mixture of 77 g. of 3-amino-2,6-dimethylpyridine and 136 g. of diethyl ethoxymethylenemalonate was heated on a steam bath under reduced pressure (15 mm.) for one hour. The resulting solid was collected and recrystallized from n-heptane using decolorizing charcoal to yield 161 g. (87%) of the product, diethyl N-(2,6-dimethyl-3-pyridyl)aminomethylenemalonate, M.P. 102–103° C. A sample recrystallized from ethanol melted at 104–105.4° C. (corr.).

Following the procedure described above for the preparation of diethyl N-(2,6-dimethyl-3-pyridyl)aminomethylenemalonate using corresponding molar equivalent quantities of the appropriate 3-aminopyridine, the N-(3-pyridyl)aminomethylenemalonates of Table B were prepared:

TABLE B

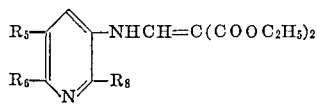

| No. | $R_5$ | $R_6$ | $R_8$ | M.P., °C. (corr.) |
|---|---|---|---|---|
| 1 | H | $C_2H_5$ | $CH_3$ | 85.8–86.2 |
| 2 | H | $C_2H_5$ | $C_2H_5$ | 81.0–83.6 |
| 3 | H | H | $CH_3$ | 100.0–100.8 |
| 4 | $CH_3$ | $CH_3$ | $CH_3$ | [1] 108–109 |

[1] Uncorr.

All of the 3-aminopyridines used in the preparation of the compounds of Table B above are known and/or are commercially available.

EXAMPLE 2

1,4-dihydro-1,6,8-trimethyl-4-oxo-1,7 - naphthyridine-3-carboxylic acid was prepared from the corresponding ethyl ester as follows: A mixture containing 64 g. of ethyl 1,4-dihydro-1,6,8-trimethyl-4-oxo-1,7-naphthyridine-3-carboxylate and 500 cc. of 5% aqueous potassium hydroxide solution was heated on a steam bath for two hours. The hot reaction mixture was treated with decolorizing charcoal and filtered. The filtrate was neutralized with 6 N hydrochloric acid. The precipitate that separated was collected and recrystallized from dimethylformamide to yield 47 g. (82%) of the product, 1,4-dihydro-1,6,8-trimethyl-4-oxo - 1,7 - naphthyridine-3-carboxylic acid, M.P. 263–265° C. [261.2–263.8° C. (corr.) with decomposition].

Alternatively, 1,4-dihydro-1,6,8-trimethyl - 4 - oxo-1,7-naphthyridine-3-carboxylic acid can be prepared following the procedure described in Example 1 using corresponding molar equivalent quantities of 4-hydroxy-6,8-dimethyl-1,7-naphthyridine-3-carboxylic acid and methyl iodide. The intermediate 4-hydroxy-6,8-dimethyl-1,7-naphthyridine-3-carboxylic acid was prepared by hydrolysis of its corresponding ethyl ester as follows: A mixture containing 54 g. of ethyl 4-hydroxy-6,8-dimethyl-1,7-naphthyridine-3-carboxylate and 340 cc. of 10% aqueous potassium hydroxide solution was heated on a steam bath for ninety minutes. The reaction mixture was acidified wtih hydrochloric acid and the resulting precipitate was collected, washed successively with water and ethanol, and recrystallized twice from ethanol to yield 6.1. g. of the product, 4-hydroxy-6,8-dimethyl-1,7-naphthyridine-3-carboxylic acid, M.P. 284.0–284.2° C. (corr.), with decomposition.

EXAMPLE 3

Ethyl 1,4-dihydro-6-ethyl-1,8-dimethyl-4-oxo-1,7-naphthyridine-3-carboxylate, M.P. 241.88–242.2° C. (corr.), was prepared (56.5% yield) following the procedure described in Example 1 using 14.3 g. of ethyl 6-ethyl-4-hydroxy-8-methyl-1,7-naphthyridine - 3 - carboxylate, 11.0 g. of anhydrous potassium carbonate, 5.0 cc. of methyl iodide and 130 cc. of dimethylformamide.

EXAMPLE 4

1,4 - dihydro - 6 - ethyl - 1,8 - dimethyl - 4 - oxo - 1,7-naphthyridine-3-carboxylic acid, M.P. 245.0–246.8° C. (corr.) was prepared (98% yield) following the procedure described in Example 2 using 10.2 g. of ethyl 1,4-dihydro-6-ethyl-1,8-dimethyl-4-oxo - 1,7 - naphthyridine-3-carboxylate, 25 cc. of 10% aqueous potassium hydroxide solution and 100 cc. of water.

EXAMPLE 5

Following the procedure described in Example 1 using 9.3 g. of ethyl 6-ethyl-8-methyl-4-hydroxy-1,7-naphthyridine-3-carboxylate, 7.5 g. of anhydrous potassium carbonate, 6.0 cc. of ethyl iodide and 85 cc. of dimethylformamide, there was prepared 0.9 g. of ethyl 1,4-dihydro-1,6-diethyl-8-methyl-4-oxo - 1,7 - naphthyridine-3-carboxylate, M.P. 156.8–158.8° C. (corr.).

The above ester was hydrolyzed to yield the corresponding acid, as follows: A small portion of the ester was heated on a steam bath with 10% aqueous potassium hydroxide solution for thirty minutes. The reaction mixture was acidified to a pH of 3.5 using hydrochloric acid. The resulting precipitate was collected, washed with water and dried in a vacuum oven at 60° C. to yield the acid, 1,4 - dihydro - 1,6 - diethyl - 8 - methyl - 4 - oxo - 1,7-naphthyridine-3-carboxylic acid, M.P. 156.8–158.8° C. (corr.).

EXAMPLE 6

Following the procedure described in Example 1 using 7.2 g. of ethyl 6,8-diethyl-4-hydroxy-1,7-naphthyridine-3-carboxylate, 18.0 g. of anhydrous potassium carbonate, 20.1 cc. of ethyl iodide and 70 cc. of dimethylformamide, there was obtained 2.0 g. of ethyl 1,6,8-triethyl-1,4-dihydro-4-oxo-1,7-naphthyridine-3-carboxylate, M.P. 127.6–129.0° C. (corr.).

The above ester was hydrolyzed to yield the corresponding acid, as follows: A small portion of the ester was heated on a steam bath with 10% aqueous potassium hydroxide solution for fifteen minutes. The reaction mixture was acidified to a pH of 3.5 using hydrochloric acid. The resulting precipitate was collected, washed with water and recrystallized from acetone to yield the acid, 1,6,8-triethyl-1,4-dihydro-4-oxo - 1,7 - naphthyridine - 3 - carboxylic acid, M.P. 151–153° C.

EXAMPLE 7

Ethyl 6,8-diethyl-1,4-dihydro-1-methyl-4-oxo-1,7-naphthyridine-3-carboxylate was prepared as follows: A mixture containing 13.7 g. of ethyl 6,8-diethyl-4-hydroxy-1,7-naphthyridine-3-carboxylate, 11.0 g. of anhydrous potassium carbonate and 100 cc. of dimethylformamide was heated on a steam bath with stirring for about fifteen minutes. To the stirred mixture was added 4 cc. of methyl iodide and heating was continued on the steam bath for three and one-half hours with subsequent additions of 4 cc. portions of methyl iodide at the end of each of the first and second hours. The reaction mixture was filtered to remove the solid and the filtrate was concentrated to dryness. The residue was triturated with 100 cc. of ethanol and the undissolved material was filtered off. The ethanol solution was concentrated to dryness, the residue taken up with 100 cc. of chloroform, the chloroform solution washed twice with water and concentrated in vacuo to dryness. The residue was dissolved in benzene, the benzene solution washed twice with water, concentrated to near dryness and treated with n-hexane whereupon a solid separated. The solid was collected and dried to yield 11.0 g. (76.5%) of the product, ethyl 6,8-diethyl-1,4-dihydro-1-methyl-4-oxo-1,7-naphthyridine - 3 - carboxylate, M.P. 150–154° C. Two recrystallizations of the product from benzene yielded a sample melting at 154–157° C.

EXAMPLE 8

6,8-diethyl-1,4-dihydro- 1 -methyl - 4 - oxo-1,7-naphthyridine-3-carboxylic acid was prepared as follows: A mixture containing 11.5 g. of ethyl 6,8-diethyl-1,4-dihydro-1-methyl-4-oxo-1,7-naphthyridine-3-carboxylate, 32 cc. of 10% potassium hydroxide solution and about 50 cc. of ethanol was heated on a steam bath for about forty-five minutes, allowing the ethanol to evaporate from the reaction mixture. The mixture was diluted with about 500 cc. of water, the mixture filtered, and the filtrate neutralized with 6 N hydrochloric acid. The resulting solid was collected, washed with water and dried to yield 8.2 g. (83%) of the product, M.P. 185–187° C. The above 8.2 g. portion of the product was combined with a 6.1 g. portion from another preparation and recrystallized from about 600 cc. of ethanol, dried at 80° C. in a vacuum oven for four hours to yield 13.0 g. of the product, M.P. 185.6–187.2° C. (corr).

EXAMPLE 9

Ethyl 1,4-dihydro - 1,8 - dimethyl-4-oxo-1,7-naphthyridine-3-carboxylate, M.P. 180.2–181.2° C. (corr.), was obtained following the procedure described in Example 1 using corresponding molar equivalent quantities of ethyl 4-hydroxy-8-methyl-1,7-naphthyridine- 3 -carboxylate, anhydrous potassium carbonate and methyl iodide.

1,4-dihydro-1,8-dimethyl-4-oxo - 1,7 - naphthyridine-3-carboxylic acid is obtained by hydrolyzing the above ester following the procedure described in Example 2 using corresponding molar equivalent quantities of the reactants.

The compounds of Table C were prepared following the indicated above described procedures using corresponding molar equivalent quantities of the appropriate reactants.

TABLE C

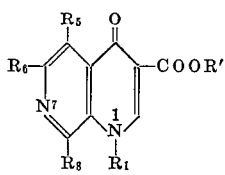

| Prep'n. like Ex. | R' | $R_1$ | $R_5$ | $R_6$ | $R_8$ | M.P., °C (corr.) |
|---|---|---|---|---|---|---|
| 1 | $C_2H_5$ | $CH_3$ | $CH_3$ | $CH_3$ | $CH_3$ | (1) |
| 2 | H | $CH_3$ | $CH_3$ | $CH_3$ | $CH_3$ | 242.0–243.8 |

1 Used to prepare acid (R'=H).

EXAMPLE 10

The following reaction of ethyl 4-hydroxy-8-methyl-1,7-naphthyridine-3-carboxylate with methyl iodide in the presence of anhydrous potassium carbonate yielded both ethyl 1,4-dihydro-1,8-dimethyl-4-oxo-1,7-naphthyridine-3-carboxylate (10A) and 3-carbethoxy-7,8-dimethyl-4-hydroxy-1,7-naphthyridinium iodide (10B).

(A) A mixture containing 28.0 g. of ethyl 4-hydroxy-8-methyl-1,7-naphthyridine-3-carboxylate, 25 g. of anhydrous potassium carbonate and 300 cc. of dimethylformamide was heated with stirring on a steam bath until most of the solids had dissolved. The mixture was then cooled slightly; 12 cc. of methyl iodide was added; and the reaction mixture was heated on the steam bath with stirring for two hours. The reaction mixture was filtered, the filtrate diluted with an equal volume of water, and a small amount of concentrated hydrochloric acid was added to decrease basicity. When no precipitate resulted, the resulting solution was evaporated to dryness. The residue was treated with about 500 cc. of water and the remaining green solid was collected and dried (10.0 g., M.P. 228° C. with decomposition; workup below, 10B). The filtrate was extracted seven times with 200 cc. portions of chloroform. The combined extracts were washed twice with water and dried over anhydrous sodium sulfate. The chloroform was evaporated off on a steam bath at atmospheric pressure. To the residue was added a small quantity of water and the mixture evaporated on a steam bath at atmospheric pressure. There was obtained 3.6 g. of solid which was recrystallized twice from absolute ethanol, the first time using decolorizing charcoal, and dried in a vacuum oven to yield 1.65 g. of ethyl 1,4-dihydro-1,8-dimethyl-4 - oxo - 1,7 - naphthyridine-3-carboxylate, M.P. 178.5–180.5° C.

Analysis.—Calcd. for $C_{13}H_{14}N_2O_3$ (percent): C, 63.40; H, 5.73; N, 11.38. Found (percent): C, 63.02; H, 5.98; N, 11.27

(B) A 5 g. portion of the above green solid was recrystallized from water using decolorizing charcoal and the resulting pale greenish-yellow solid was dried in a vacuum oven to yield 3.6 g. of 3-carbethoxy-4-hydroxy-7,8-dimethyl - 1,7 - naphthyridinium iodide, M.P. 221.0–226.0° C. (corr.) with decomposition.

Analysis.—Calcd. for $C_{13}H_{15}IN_2O_3$ (percent): C, 41.73; H, 4.04; I, 33.92; N, 7.49. Found (percent): C, 41.80; H, 4.23; I, 34.00; N, 6.91, 6.95.

EXAMPLE 11

(A) 3-carboxy - 4 - hydroxy-6,7,8-trimethyl-1,7-naphthyridinium hydroxide inner salt.—A mixture containing 45 g. of 3-carbethoxy-4-hydroxy-6,7,8-trimethyl-1,7-naphthyridinium iodide and 250 cc. of 10% aqueous potassium hydroxide solution was heated on a steam bath for thirty minutes, decolorizing charcoal added, and the hot mixture filtered. To the filtrate was added acetic acid until no further precipitation resulted; the mixture was cooled; and the precipitate was collected, recrystallized twice from water (using decolorizing charcoal the second time), and dried in a vacuum oven at 70° C. to yield 10 g. of 3-carboxy - 4-hydroxy-6,7,8-trimethyl-1,7-naphthyridinium hydroxide inner salt, M.P. 320–321° C. with decomposition.

Analysis.—Calcd. for $C_{12}H_{12}N_2O_3$ (percent): C, 62.06; H, 5.21; N, 12.06. Found (percent): C, 61.93; H, 5.21; N, 11.88.

A preferred procedure for preparing the above hydroxide inner salt is described as follows: A sample (see Example 11B for preparation) of 3-carboxy-4-hydroxy-6,7,8 - trimethyl - 1,7 - naphthyridinium chloride was dissolved in about three liters of warm water, the solution treated with decolorizing charcoal and filtered, and the filtrate treated with sufficient 10% aqueous potassium hydroxide solution (250 ml.) to adjust the solution to a pH of 6. The resulting precipitate was collected and dried to yield 100 g. of 3-carboxy-4-hydroxy-6,7,8-trimethyl-1,7-naphthyridinium hydroxide inner salt, M.P. 312° C. with decomposition.

(B) The above intermediate 3-carbethoxy-4-hydroxy-6,7,8 - trimethyl - 1,7 - naphthyridinium iodide and 3-carboxy-4-hydroxy-6,7,8-trimethyl-1,7-naphthyridinium chloride were prepared as follows: A mixture containing 49.2 g. of ethyl 6,8-dimethyl-4-hydroxy-1,7-naphthyridine-3-carboxylate, 50 cc. of methyl iodide and 500 cc. of dimethylformamide was heated on a steam bath with stirring for five hours. The reaction mixture was cooled and the precipitate collected to yield 11 g. of the methiodide. The filtrate was treated with two volumes of ether and the resulting precipitate collected to yield another 34 g. of 3-carbethoxy - 4 - hydroxy-6,7,8-trimethyl-1,7-naphthyridinium iodide. The corresponding 3-carboxy-4-hydroxy-6,7,8-trimethyl - 1,7 - naphthyridinium chloride was prepared as follows: A mixture containing 246 g. of ethyl 4 - hydroxy-6,7-dimethyl-1,8-naphthyridine-3-carboxylate, 125 ml. of methyl iodide and three liters of dimethylformamide was heated with stirring under a reflux condenser for twenty hours on a steam bath. The reaction solution was cooled whereupon the crystalline product separated. The precipitate was collected and the filtrate condensed to a volume of 700 ml. and chilled to obtain a second crop of product. The combined crops were washed with acetone and dried to yield 242 g. of 3-carbethoxy - 4-hydroxy-6,7,8-trimethyl-1,7-naphthyridinium iodide which was dissolved in 720 ml. of 10% aqueous potassium hydroxide solution and three liters of water. The resulting solution was heated for thirty minutes at 85° C. The solution was treated with sufficient hydrochloric acid to adjust the pH to about 6 whereupon the precipitate separated. The precipitate was collected and was recrystallized from a solution containing 100 ml.

of 6 N hydrochloric acid and 250 ml. of water using decolorizing charcoal to yield 3-carboxy-4-hydroxy-6,7,8-trimethyl-1,7-naphthyridinium chloride.

(C) Following the procedure of Example 11B using a corresponding molar equivalent quantity of ethyl iodide or n-butyl bromide or allyl chloride in place of methyl iodide, there is obtained, respectively, 3-carbethoxy-7-ethyl - 4-hydroxy-6,8-dimethyl-1,7-naphthyridinium iodide 7 - n - butyl - 3 - carbethoxy-4-hydroxy-6,8-dimethyl-1,7-naphthyridinium bromide or 7- allyl-3-carbethoxy-6,8-dimethyl-4-hydroxy-1,7-naphthyridinium chloride.

EXAMPLE 12

3-carboxy - 4 - hydroxy-7,8-dimethyl-1,7-naphthyridinium hydroxide inner salt.—A mixture containing 33.5 g. of 3-carbethoxy-4-hydroxy-7,8-dimethyl-1,7-naphthyridinium iodide and 70 cc. of 6 N aqueous hydrochloric acid solution was heated with stirring on a steam bath for ninety minutes. Decolorizing charcoal and a little more water were added, and the mixture heated an additional fifteen minutes and filtered. The filtrate was placed in an ice bath and the solid that separated was collected. The solid was taken up in about 250 cc. of boiling water, the hot solution filtered to remove a small amount of insoluble material, and the filtrate allowed to cool. The crystalline precipitate that separated was collected to yield 19.5 g. (63%) of 3-carboxy-4-hydroxy-7,8-dimethyl-1,7-naphthyridinium iodide, M.P. 262° C. with decomposition. This product was dispersed in hot water, neutralized with 10% aqueous potassium bicarbonate solution, the hot solution treated with decolorizing charcoal and filtered, and the filtrate cooled in an ice bath. The resulting crystalline precipitate was collected, recrystallized once from about 175 cc. of water containing a litttle potassium bicarbonate, and recrystallized a second time from water and dried in a vacuum oven to yield 3.5 g. of 3 - carboxy-4-hydroxy-7,8-dimethyl-1,7-naphthyridinium hydroxide inner salt, a greenish-yellow powder, M.P. 308° C. with decomposition. On the basis of infrared spectral data and the following analysis, this product probably has the structure of Formula II where Z is COOH, $R_5$ and $R_6$ are each H, and $R_7$ and $R_8$ are each $CH_3$.

*Analysis.*—Calcd. for $C_{11}H_{10}N_2O_3$ (percent): C, 60.54; H, 4.62; N, 12.84. Found (percent): C, 60.61; H, 4.81; N, 13.01.

EXAMPLE 13

3-carboxy-1,4-dihydro - 1,6,7,8 - tetramethyl-4-oxo-1,7-naphthyridinium hydroxide inner salts.—To a suspension of 20 g. of 3-carboxy-1,4-dihydro-1,6,7,8-tetramethyl-4-oxo-1,7-naphthyridinium iodide in 25 cc. of cold water was added 4.5 cc. of 28% aqueous ammonia and the solution was filtered. About 300 cc. of acetone was added to the filtrate and the oily material that separated was triturated to induce solidification of the oil. The resulting yellow solid was collected, recrystallized once from water-acetone and twice from water, and dried for seventy hours at 78° C. in a vacuum oven to yield 7.2 g. of 3-carboxy-1,4-dihydro-1,6,7,8-tetramethyl-4-oxo-1,7 - naphthyridinium hydroxide inner salt, an orange solid, M.P. 210.0–211.0° C. (corr.) with decomposition. On the basis of NMR and infrared spectral data and the following analysis, the product has the structure of Formula III where $R_5$ is H, and $R_1$, $R_6$, $R_7$ and $R_8$ are each $CH_3$.

*Analysis.*—Calcd. for $C_{13}H_{14}N_2O_3$ (percent): C, 63.40; H, 5.73; N, 11.38. Found (percent): C, 62.68; H, 5.53; N, 10.91; $H_2O$, 0.9. Found (dry basis): C, 63.25; H, 5.48; N, 11.01..

A preferred procedure for preparing the above hydroxide inner salt is described as follows: A mixture containing 86 g. of 1,4-dihydro-1,6,8-trimethyl-4-oxo-1,7-naphthyridine-3-carboxylic acid, 62 ml. of methyl iodide and 900 ml. dimethylformamide was heated on a steam bath under reflux with stirring for forty-eight hours. Two additional portions of methyl iodide (62 ml. each) were added after heating periods of 17 and 25 hours respectively. The reaction mixture was cooled in an ice bath and the solid was collected, washed with acetone and dried to yield 66.7 g. of 3-carboxy-1,4-dihydro-1,6,7,8-tetramethyl-4-oxo-1,7-naphthyridinium iodide. Said 1,7-naphthyridinium iodide was treated with 17.7 g. of triethylamine and 50 ml. of water. To the turbid solution was added immediately 100 ml. of acetone whereupon a solid separated. The solid was collected, dissolved in 200 ml. warm water and re-precipitated by the addition of 700 ml. of acetone. The product was collected and recrystallized twice from water, using decolorizing charcoal, and dried overnight at 80° C. in a vacuum oven to yield 28.6 g. of 3-carboxy-1,4-dihydro-1,6,7,8-tetramethyl-4-oxo-1,7-naphthyridinium hydroxide inner salt, M.P. 211–213° C.

EXAMPLE 14

(A) 1,4 - dihydro-1,6-dimethyl-8-hydroxy-4-oxo-quinoline-3-carboxylic acid from 3-carbethoxy-1,4-dihydro-4-oxo-1,6,7,8-tetramethyl - 1,7-naphthyridinium iodide.—A mixture containing 0.7 g. of 3-carbethoxy-1,4-dihydro-1,6,7,8-tetramethyl-4-oxo - 1,7 - naphthyridinium iodide monohydrate, 2.0 cc. of 10% aqueous potassium hydroxide solution and 10 cc. of water was heated on a steam bath for about fifteen minutes whereupon solid started to separate. The reaction mixture was diluted to a volume of 25 cc. with water and heating was continued for an additional ninety minutes, at which time an additional 2.0 cc. of 10% potassium hydroxide solution was added to dissolve the precipitated solid. The solution was then heated an additional hour on a steam bath, filtered and to a filtrate was added hydrochloric acid to a pH of 3.5. The solid that separated was collected and recrystallized from about 10 cc. of dimethylformamide to yield 300 mg. of sparkling tan needles, M.P. 340° C. with decomposition after triturating successively with ethanol and ether. The compound also gave a negative test for halogen. The compound was dissolved in aqueous potassium hydroxide solution, filtered, and the filtrate was heated to its boiling point and acidified with acetic acid to a pH of 7. The solid was separated, washed successively with water and acetone and dried to yield the white solid product, 1,4-dihydro-8-hydroxy-1,6-dimethyl - 4 - oxoquinoline-3-carboxylic acid, M.P. 340–345° C. with decomposition, the structure of which was confirmed by its NMR and infrared spectral analyses, and the following analysis.

*Analysis.*—Calcd. for $C_{12}H_{11}NO_4$ (percent): C, 61.80; H, 4.75; N, 6.01. Found (percent): C, 61.80; H, 4.83; N, 5.81.

The above reaction was also carried out at room temperature, as follows: A 20.6 g. sample of 3-carboxy-1,4-dihydro-1,6,7,8-tetramethyl - 4 - oxo-1,7-naphthyridinium iodide was dissolved in 103 ml. of 10% aqueous potassium hydroxide solution whereupon a strong amine odor was evident. After ten minutes at room temperature, an NMR spectrum of the solution indicated that the reaction was complete. After thirty minutes at room temperature, the reaction solution was acidified with hydrochloric acid and the resulting finely divided white solid which separated was collected to yield 11.4 g. of 1,4-dihydro-8-hydroxy-1,6-dimethyl - 4 - oxoquinoline-3-carboxylic acid, M.P. 340° C. with decomposition, the structure of which was confirmed by its NMR and infrared spectral data and the following analysis:

*Analysis.*—Calcd. for $C_{12}H_{11}NO_4$ (percent): C, 61.80; H, 4.75; N, 6.01. Found (percent): C, 61.35; H, 4.90; N, 5.77.

(B) The intermediate 3-carbethoxy-1,4-dihydro-1,6,7,8-tetramethyl-4-oxo-1,7-naphthyridinium iodide was prepared as follows: A solution containing 5.6 g. of ethyl 1,4-dihydro-1,6,8-trimethyl - 4 - oxo-1,7-naphthyridine-3-carboxylate, 75 cc. of dimethylformamide and 6 cc. of methyl iodide was heated on a steam bath for sixteen hours, allowed to cool to room temperature, and filtered.

The filtrate was concentrated and the residual liquid taken up in 100 cc. of ethanol. When cooling yielded a tarry material, the mixture was heated on a steam bath in vacuo to remove the ethanol. Water was added to the residual material and the mixture chilled. The tarry material that separated was filtered off by filtering the mixture through infosorial earth (Super-Cel). The aqueous filtrate was concentrated to about 75 cc. and chilled; the light orange solid that separated was collected, recrystallized from ethanol and dried in a vacuum oven at 50° C. to yield 1.8 g. of 3-carbethoxy-1,4-dihydro-1,6,7,8-tetramethyl-4-oxo-1,7-naphthyridinium iodide as its monohydrate.

*Analysis.*—Calcd. for $C_{15}H_{19}IN_2O_3$ (percent): N, 6.96; I, 31.55. Found (percent): $H_2O$, 4.48; N, 6.43; I, 30.00. Found (dry basis): N, 6.73; I, 31.41.

(C) Following the procedure in Example 12 for the hydrolysis of 3-carbethoxy-7,8-dimethyl - 4 - hydroxy-1,7-naphthyridinium iodide with hydrochloric acid to the corresponding 3-carboxy compound, 3-carboxy-1,4-dihydro-1,6,7,8-tetramethyl-4-oxo-1,7-naphthyridinium iodide is obtained using corresponding molar equivalent quantities of 3-carbethoxy-1,4-dihydro-1,6,7,8-tetramethyl-4-oxo-1,7-naphthyridinium iodide monohydrate and hydrochloric acid.

(D) Following the procedure described in Example 14A using a molar equivalent quantity of 7-allyl-3-carbethoxy-1,4 - dihydro - 1,6,8 - trimethyl - 4-oxo-1,7-naphthyridinium bromide in place of 3-carbethoxy-1,4-dihydro-1,6,7,8-tetramethyl-4-oxo - 1,7 - naphthyridinium iodide, there is obtained the same product, 1,4-dihydro-8-hydroxy - 1,6 - dimethyl - 4 - oxoquinoline-3-carboxylic acid. The intermediate 7-allyl-3-carbethoxy-1,4-dihydro-1,6,7-trimethyl-4-oxo-1,7-naphthyridinium bromide is obtained following the procedure described in Example 14B using a molar equivalent quantity of allyl bromide in place of methyl iodide.

(E) Following the procedure described in Example 14A using a molar equivalent quantity of 3-carbethoxy-1,4-dihydro-1,5,6,7,8 - pentamethyl - 4 - oxo-1,7-naphthyridinium bromide in place of 3-carbethoxy-1,4-dihydro-1,6,7,8 - tetramethyl - 4 - oxo-1,7-naphthyridinium iodide, there is obtained 1,4-dihydro-8-hydroxy - 1,5,6 - trimethyl-4-oxoquinaline - 3 - carboxylic acid. The intermediate 3 - carbethoxy - 1,4 - dihydro - 1,5,6,7,8-pentamethyl-4-oxo-1,7 - naphthyridinum bromide is obtained following the procedure described in Example 14B using ethyl 1,4-dihydro-1,5,6,8 - tetramethyl - 4 - oxo-1,7-naphthyridine-3-carboxylate in place of ethyl, 1,4-dihydro-1,6,8-trimethyl-4-oxo-1,7-naphthyridine-3-carboxylate.

EXAMPLE 15

1,4-dihydro - 8 - hydroxy - 1,6-dimethyl-4-oxoquinoline - 3 - carboxylic acid from 3-carboxy-1,4-dihydro-1,6,7,8 - tetramethyl-4-oxo-1,7-naphthyridinium iodide.— To a solution containing 12.7 g. of 3-carboxy-1,4-dihydro-1,6,7,8 - tetramethyl - 4 - oxo-1,7-naphthyridinium iodide in 400 cc. of water was added 50 cc. of 10% aqueous potassium hydroxide solution. The resulting solution was heated on a steam bath for forty minutes and acidified with hydrochlor acid to a pH of 4. The resulting white precipitate was collected, washed successively with water and acetone, and dried to yield 7.2 g. of 1,4-dihydro-8-hydroxy-1,6 - dimethyl - 4 - oxoquinoline-3-carboxylic acid, M.P. 340° C. with decomposition.

EXAMPLE 16

4,8 - dihydroxy - 6 - methylquinoline-3-carboxylic acid from 3 - carboxy - 4 - hydroxy 6,7,8 - trimethyl-1,7-naphthyridinium hydroxide inner salt.—A solution containing 1.0 g. of 3 - carboxy - 4 - hydroxy-6,7,8-trimethyl-1,7-naphthyridinium hydroxide inner salt and 6.5 cc. of 10% aqueous potassium hydroxide solution was heated on a steam bath under a reflux condenser for sixteen hours. The reaction mixture was diluted to a volume of about 80 cc. with water and the resulting solution acidified with 1 cc. of acetic acid. The solid that separated was collected, washed successively with water and acetone, and dried to yield 390 mg. of 4,8-dihydroxy-6-methylquinoline-3-carboxylic acid, M.P. 295° C. with decomposition.

*Analysis.*—Calcd. for $C_{11}H_9NO_4$ (Percent): C, 60.27; H, 4.14; N, 6.39. Found (Percent): C, 59.99; H, 4.30; N, 7.09.

EXAMPLE 17

(A) 4,8 - dihydroxy - 6,7 - dimethylquinoline-3-carboxylic acid from 3-carboxy-8-ethyl-6,7 - dimethyl-4-hydroxy-1,7-naphthyridinium hydroxide inner salt.—A solution containing 1.0 g. of 3 - carboxy - 8 - ethyl-4-hydroxy-6,7 - dimethyl - 1,7 - naphthyridinium hydroxide inner salt and 6.0 cc. of 10% aqueous potassium hydroxide solution was heated on a steam bath for two and one-half hours. The reaction mixture was diluted to a volume of about 40 cc. with water; 1 cc. of acetic acid was added to the hot solution; and, the solid that separated was collected and triturated twice with 100 cc. portions of hot water to remove any unreacted starting material. The solid was then recrystallized by dissolving it in hot dimethylformamide and adding water to the boiling dimethylformamide solution to precipitate the product which was collected, washed successively with water and acetone, and dried in a vacuum oven at 60° C. to yield 4,8 - dihydroxy - 6,7 - dimethylquinoline-3-carboxylic acid, M.P. 290° C. with decomposition. Nuclear magnetic resonance spectral analysis of this compound showed two sharp methyl signals.

*Analysis.*—Calcd. for $C_{12}H_{11}NO_4$ (Percent): C, 61.80; H, 4.75; N, 6.01. Found (Percent): C, 61.37; H, 4.84; N, 5.78.

(B) The above intermediate 3 - carboxy-8-ethyl-4-hydroxy-6,7 - dimethyl - 1,7 - naphthyridinium hydroxide inner salt was prepared by methylating the corresponding 3-carboxy - 4 - hydroxy - 6,7,8 - trimethyl-1,7-naphthyridinium hydroxide inner salt, as follows: A mixture containing 7.0 g. of 3-carboxy-4-hydroxy-6,7,8-trimethyl-1,7-naphthyridinium hydroxide inner salt, 4.2 g. of anhydrous potassium carbonate and 80 cc. of dimethylformamide was heated with stirring on a steam bath for ten minutes. To this mixture was added 5 cc. of methyl iodide and the resulting reaction mixture was stirred on the steam bath for two hours and then filtered. The filtrate was chilled and the solid that separated was collected and washed with acetone. In case some methyl ester had been formed, the solid was dissolved in 125 cc. of hot water, 30 cc. of 10% aqueous potassium hydroxide solution was added, and the resulting mixture heated on a steam bath for three minutes (this amount of time is sufficient to hydrolyze any 3-carbomethoxy compound to the corresponding 3-carboxy compound without effecting any appreciable ring opening to form the 8-hydroxyquinoline shown above). The alkaline solution was acidified with acetic acid and chilled. The resulting precipitate was collected, washed with acetone, dried, recrystallized four times from dimethylformamide, triturated successively with water and ethanol at room temperature, and dried in vacuo at 65° C. to yield 3-carboxy-8-ethyl-4-hydroxy-6,7 - dimethyl - 1,7 - naphthyridinium hydroxide inner salt, M.P. 309° C. with decomposition.

*Analysis.*—Calcd. for $C_{13}H_{14}N_2O_3$ (Percent): C, 63.40; H, 5.73; N, 11.38. Found (Percent): C, 63.08; H, 5.60; N, 11.38.

(C) Following the procedure described in Example 17A using the appropriate 8-substituted-1,7-naphthyridinium salt, the following compounds are obtained: 7-ethyl - 4,8 - dihydroxy - 6 - methylquinoline-3-carboxylic acid using 3-carboxy-4-hydroxy-6,7 - dimethyl - 8 - n-propyl-1,7-naphthyridinium hydroxide inner salt (prepared as in Example 17B using ethyl iodide in place of methyl iodide), and 7-benzyl-4,8 - dihydroxyquinoline- 3-carboxylic acid 3 - carboxy - 7 - methyl - 8-(2-phenylethyl) - 1,7 - naphthyridinium chloride (prepared as in Example 17B using 3-carboxy-7-methyl-8 - (2 - phenylethyl)chloride and benzyl chloride).

EXAMPLE 18

3-carboxy-6-ethyl-4-hydroxy - 7,8 - dimethyl-1,7-naphthyridinium hydroxide inner salt.—A stirred mixture containing 104 g. of ethyl 6-ethyl-4-hydroxy-8-methyl-1,7-naphthyridine-3-carboxylate, 62 ml. of methyl iodide and 550 ml. of dimethylformamide was heated on a stream bath for twelve hours under a reflux condenser. The resulting dark green solution was concentrated in vacuo to remove the solvent, the residue was dissolved in 200 ml. of warm water and to the solution was added 17 ml. 6 N hydrochloric acid. The solution was heated on a steam bath for two hours and was then neutralized with 170 ml. of 10% aqueous potassium hydroxide solution followed by addition of 100 ml. of 10% aqueous potassium bicarbonate solution. The green solid which separated on standing overnight was collected and recrystallized from water to yield 54.5 g. of a light green solid. The compound gave a negative halide test with silver nitrate and examination by NMR indicated incomplete hydrolysis. The solid was then dissolved in 40 ml. of 6 N hydrochloric acid and 150 ml. of water. The solution was heated in an open beaker for three and one-half hours allowing evaporation to occur. The resulting slushy material was diluted in 700 ml. of water and neutralized (to a pH of about 7) with 10% aqueous potassium hydroxide solution. The precipitated product was collected, washed with water and dried to yield 40.0 g. of crystalline yellow 3-carboxy-6-ethyl-4-hydroxy-7,8-dimethyl-1,7-naphthyridinium hydroxide inner salt, M.P. 300° C. with decomposition.

Analysis.—Calcd. for $C_{13}H_{14}N_2O_3$ (percent): C, 63.40; H, 5.73; N, 11.38. Found (percent): C, 63.48; H, 5.68; N, 11.24.

EXAMPLE 19

6 - ethyl-4,8-dihydroxyquinoline-3-carboxylic acid.—A stirred mixture containing 4.92 g. of 3-carboxy-6-ethyl-4-hydroxy-7,8-dimethyl - 1,7 - naphthyridinium hydroxide inner salt and 20 ml. of 10 M aqueous potassium hydroxide solution was heated on a steam bath for seventy minutes. The reaction solution was diluted with hot water and treated with hydrochloric acid (pH of about 3.5) to precipitate the solid product. The solid was collected and recrystallized from dimethylformamide to yield 3.37 g. of tan crystalline 6-ethyl-4,8-dihydroxyquinoline-3- carboxylic acid, minimum M.P. 270° C. with decomposition (dependent on temperature of immersion).

Analysis.—Calcd. for $C_{12}H_{11}NO_4$ (percent): C, 61.80; H, 4.75; N, 6.01. Found (percent): C, 61.95; H, 4.99; N, 6.16.

EXAMPLE 20

3-carboxy - 4 - hydroxy - 6,7 - dimethyl-8-(2-phenylethyl)-1,7-naphthyridinium salts.—A mixture containing 46.4 g. of 3-carboxy-4-hydroxy - 6,7,8 - trimethyl-1,7-naphthyridinium hydroxide inner salt, 69 g. of anhydrous potassium carbonate, 76 g. of benzyl chloride and 500 ml. of dimethylformamide was heated on a steam bath with stirring for two and one-half hours under a reflux condenser. The reaction mixture was allowed to cool to room temperature and filtered. The filtrate was washed with dimethylformamide and the washings combined with the filtrate from the reaction mixture. The combined filtrates were concentrated in vacuo to remove the solvent and 300 ml. of water was added to the residue while heating on a steam bath. The mixture was cooled and the aqueous phase was decanted from a gummy material which was triturated with a second 300 ml. portion of water on a steam bath and the water removed again by decantation. The gummy material was dissolved in 200 ml. of ethanol; 200 ml. of 5% aqueous potassium hydroxide was added; and, the mixture was heated on a steam bath for about four hours allowing the solvents to boil off. To the remaining volume of about 100 ml. was added 150 ml. of water and the mixture heated for an additional three hours. The resulting solution was treated with hydrochloric acid to adjust its pH to about 3.5, thereby precipitating a gummy material. The aqueous phase was decanted from the gummy material which was triturated with 600 ml. of boiling acetone whereupon a yellow solid resulted. The solid was collected and dried to yield 30.2 g. of 3-carboxy-4-hydroxy-6,7-dimethyl-8-(2-phenylethyl) - 1,7 - naphthyridinium hydroxide inner salt. The hydroxide inner salt was recrystallized from a solution of 500 ml. of water plus 100 ml. of 6 N hydrochloric acid using decolorizing charcoal to obtain, after drying, 70° C. in a vacuum oven, 27.1 g. of 3-carboxy-4-hydroxy-6,7-dimethyl - 8 - (2 - phenylethyl)-1,7-naphthyridinium chloride. The structure of the compound was confirmed by its NMR and infrared spectral analysis.

Following the procedure described in Example 20 using corresponding molar equivalent quantities of the reactants and using 2-phenylethyl chloride, 3-phenylpropyl bromide and 4-phenylbutyl chloride in place of benzyl chloride, there is obtained, respectively, 3-carboxy-4 - hydroxy - 6,7 - dimethyl - 8 - (3-phenylpropyl)-1,7-naphthyridinium hydroxide inner salt, 3-carboxy - 4 - hydroxy-6,7-dimethyl-8-(4-phenylbutyl) - 1,7 - naphthyridinium hydroxide inner salt or 3-carboxy-4-hydroxy-6,7-dimethyl-8-(5-phenylpentyl) - 1,7 - naphthyridinium hydroxide inner salt. The corresponding 1,7 - naphthyridinium chloride salts are prepared from the hydroxide inner salts as in Example 20.

EXAMPLE 21

7-benzyl - 4,8 - dihydroxy - 6 - methylquinoline-3-carboxylic acid.—A stirred mixture containing 3.59 g. of 3-carboxy-4-hydroxy - 6,7 - dimethyl-8-(2-phenylethyl)-1,7-naphthyridinium chloride, 20 ml. of 10 M aqueous potassium hydroxide solution and 20 ml. of water was heated on a steam bath for two and one-half hours. The reaction mixture was diluted with 150 ml. of water, the resulting mixture reheated and then acidified with 35 ml. of 6 N hydrochloric acid. The resulting tan solid was collected, washed with water, dried, and recrystallized from acetone to yield 1.32 g. of 7-benzyl-4,8-dihydroxy-6-methylquinoline-3-carboxylic acid, M.P. 259–260° C.

Following the procedure described in Example 21 but using corresponding molar equivalent quantities of 3-carboxy-4-hydroxy - 6,7 - dimethyl-8-(3-phenylpropyl)-1,7-naphthyridinium chloride, 3-carboxy-4-hydroxy-6,7-dimethyl - 8 - (4-phenylbutyl)-1,7-naphthyridinium chloride or 3-carboxy-4-hydroxy - 6,7 - dimethyl-8-(5-phenylpentyl)-1,7-naphthyridinium chloride in place of 3-carboxy-4-hydroxy - 6,7 - dimethyl-8-(2 - phenylethyl)-1,7-naphthyridinium chloride, there is obtained, respectively, 4,8 - dihydroxy - 6 - methyl-7-(2-phenylethyl)-quinoline-3-carboxylic acid, 4,8-dihydroxy-6-methyl-7-(3-phenylpropyl)quinoline-3-carboxylic acid, or 4,8-dihydroxy-6-methyl-7-(4-phenylbutyl)quinoline-3-carboxylic acid.

The actual determination of the numerical antibacterial data definitive for a particular 8-hydroxy-3-carboxylic acid produced by the process of the invention is readily obtained by standard antibacterial test procedures by technicians versed in antibacterial testing, without any need for any extensive experimentation.

The 8-hydroxyquinoline-3-carboxylic acids produced by the process of the invention can be prepared for use by conventional pharmaceutical procedures: that is, by dissolving or suspending them in a pharmaceutically acceptable vehicle, e.g., aqueous alcohol, glycol, oil solution, or oil-water emulsion, for parenteral or oral administration; or by incorporating them in unit dosage form as tablets or capsules for oral administration either alone or in combination with conventional adjuvants, e.g., calcium carbonate, starch, lactose, talc, magnesium stearate, gum acacia, and the like.

The subject matter which the applicant regards as his invention is particularly pointed out and distinctly claimed as follows:

1. The process which comprises the steps of reacting a 3-carboxy-8-(R—CH$_2$)-7-R$_7$-1,7-naphthyridinium salt with an aqueous alkaline medium and acidifying the alkaline reaction mixture, thereby producing an 8-hydroxy-7-R-quinoline-3-carboxylic acid, wherein R is hydrogen, lower-alkyl having one to five carbon atoms inclusive or phenyl-X where X is alkylene having from one to three carbon atoms inclusive, and R$_7$ is lower-alkyl or lower-alkenyl.

2. The process according to claim 1 where R$_7$ is lower-alkyl.

3. The process according to claim 2 where the first step is carried out in an aqueous alkali hydroxide medium.

4. The process according to claim 3 using 3-carboxy-4-hydroxy-7,8-di-(lower-alkyl)-1,7-naphthyridinium salt and obtaining a 4,8-dihydroxyquinoline-3-carboxylic acid.

5. The process according to claim 3 using 3-carboxy-1,4-dihydro-1,7,8-tri-(lower-alkyl)-4-oxo-1,7-naphthyridinium salt and obtaining a 1,4-dihydro-8-hydroxy-1-(lower-alkyl)-4-oxoquinoline-3-carboxylic acid.

6. The process according to claim 3 using 3-carboxy-4-hydroxy-7,8-di-(lower-alkyl)-1,7-naphthyridinium hydroxide inner salt and obtaining a 4,8-dihydroxyquinoline-3-carboxylic acid.

7. The process according to claim 3 using 3-carboxy-4-hydroxy-6,7,8-trimethyl-1,7-naphthyridinium hydroxide inner salt and obtaining 4,8-dihydroxy-6-methylquinoline-3-carboxylic acid.

8. The process according to claim 3 using 3-carboxy-8-ethyl-4-hydroxy-6,7-dimethyl-1,7-naphthyridinium hydroxide inner salt and obtaining 4,8-dihydroxy-6,7-dimethylquinoline-3-carboxylic acid.

9. The process according to claim 3 using 3-carboxy-1,4-dihydroxy-4-oxo-1,7,8-tri-(lower-alkyl)-1,7-naphthyridinium hydroxide inner salt and obtaining a 1,4-dihydro-8-hydroxy-1-(lower-alkyl)-4-oxoquinoline-3-carboxylic acid.

10. The process according to claim 3 using 3-carboxy-1,4-dihydro-1,6,7,8-tetramethyl-4-oxo-1,7-naphthyridinium hydroxide inner salt and obtaining a 1,4-dihydro-1,6-dimethyl-8-hydroxy-4-oxoquinoline-3-carboxylic acid.

11. The process according to claim 3 using 3-carboxy-4-hydroxy-6,7-dimethyl-8-(2-phenylethyl)-1,7-naphthyridinium halide and obtaining 7-benzyl-4,8-dihydroxy-6-methylquinoline-3-carboxylic acid.

12. 7-benzyl-4,8-dihydroxy-6-methylquinoline-3-carboxylic acid.

References Cited
UNITED STATES PATENTS

| | | | |
|---|---|---|---|
| 2,614,121 | 10/1952 | Price | 260—287 |
| 3,300,499 | 1/1967 | Lesher | 260—287 |
| 3,399,203 | 8/1968 | Patchett | 260—287 |

DONALD G. DAUS, Primary Examiner

U.S. Cl. X.R.

260—295, 999

PO-1050
(5/69)

UNITED STATES PATENT OFFICE
CERTIFICATE OF CORRECTION

Patent No. 3,517,014                    Dated June 23, 1970

Inventor(s) George Y. Lesher

It is certified that error appears in the above-identified patent and that said Letters Patent are hereby corrected as shown below:

Column 1, line 32, "Jan. 1," should read --Jan. 12,--. Column 2, line 27, "-carboxylic" should read -- -carboxylate --; line 35, "8-lower-" should read -- 8-(lower- --. Column 6, line 62, Table A (heading of fifth column), "M.-.," should read --M.P.,--; line 67, Table A (line no. 4 under M.P.,°C.), "232-23" should read --232-235--. Column 7, line 64, "241.88" should read --241.8--. Column 13, line 32, "oxoquinaline" should read --oxoquinoline--; line 44, "oxoquinaline" should read --oxoquinoline--; line 69, "-hydroxy" should read --hydroxy- Column 15, line 11, "stream" should read --steam--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents